United States Patent [19]

Gelbman

[11] Patent Number: 4,900,359

[45] Date of Patent: Feb. 13, 1990

[54] CELLULAR CONCRETE

[75] Inventor: Lawrence F. Gelbman, Yonkers, N.Y.

[73] Assignee: Lisa Concrete Inc., Belvidere, N.J.

[21] Appl. No.: 361,827

[22] Filed: Jun. 1, 1989

Related U.S. Application Data

[63] Continuation of Ser. No. 55,725, May 29, 1987, abandoned, which is a continuation-in-part of Ser. No. 824,059, Jan. 30, 1982, Pat. No. 4,673,437, which is a continuation-in-part of Ser. No. 623,989, Jun. 25, 1984, Pat. No. 4,568,390.

[51] Int. Cl.$^4$ .................... C04B 24/08; C04B 28/26
[52] U.S. Cl. ........................... 106/86; 106/87; 106/97; 106/75; 106/76; 106/82; 106/88; 106/95

[56] References Cited

U.S. PATENT DOCUMENTS

| | | |
|---|---|---|
| 112,929 | 3/1871 | Kreischer . |
| 1,751,430 | 3/1930 | Thomson . |
| 1,932,971 | 10/1933 | Huttemann et al. ............... 18/47.5 |
| 2,053,842 | 9/1936 | Rice ...................................... 106/24 |
| 2,364,344 | 12/1944 | Connell et al. ..................... 106/86 |
| 2,432,971 | 12/1947 | Ruthman et al. ................... 106/86 |
| 2,598,981 | 6/1952 | Denning .............................. 106/86 |
| 2,864,714 | 12/1958 | Dixon et al. ........................ 106/88 |
| 3,041,190 | 6/1962 | Griffith et al. ..................... 106/40 |
| 3,062,669 | 11/1962 | Dilnot ................................. 106/87 |
| 3,192,060 | 6/1965 | Tilsen ................................. 106/97 |
| 3,563,930 | 2/1971 | Stram et al. ........................ 260/40 |
| 3,573,941 | 4/1971 | Edwards et al. .................... 106/88 |
| 3,615,784 | 10/1971 | Cattanach .......................... 106/88 |
| 3,625,723 | 12/1971 | Sicka .................................. 106/86 |
| 3,663,287 | 5/1972 | Mizunuma et al. ................ 106/315 |
| 3,669,701 | 6/1972 | Biederman, Jr. ................... 106/120 |
| 3,852,084 | 12/1974 | Webster et al. .................... 106/118 |
| 3,867,159 | 2/1975 | Ergene ................................ 106/88 |
| 3,963,507 | 6/1976 | Kuramoto et al. ................. 106/86 |
| 3,989,534 | 11/1976 | Plunguian et al. ................. 106/86 |
| 4,084,980 | 4/1978 | Motoki ............................... 106/87 |
| 4,097,422 | 6/1978 | Markusch ........................... 521/122 |
| 4,113,913 | 9/1978 | Smiley ................................ 428/310 |
| 4,116,703 | 9/1978 | Stempin et al. .................... 106/75 |
| 4,142,910 | 3/1979 | Kraemer et al. .................... 106/97 |
| 4,268,316 | 5/1981 | Wills, Jr. ............................. 106/97 |
| 4,341,876 | 7/1982 | Kreuer et al. ....................... 106/170 |
| 4,351,670 | 9/1982 | Grice .................................. 106/88 |
| 4,568,390 | 2/1986 | Gelbman ............................ 106/97 |
| 4,673,437 | 6/1987 | Gelbman ............................ 106/97 |
| 4,683,019 | 7/1987 | Motoki ............................... 106/74 |

FOREIGN PATENT DOCUMENTS

| | | |
|---|---|---|
| 144247 | 1/1951 | Australia ............................ 106/87 |
| 2547908 | 4/1977 | Fed. Rep. of Germany ........ 106/86 |
| 593309 | 10/1947 | United Kingdom ............ 106/288 B |

Primary Examiner—Mark L. Bell
Assistant Examiner—David M. Brunsman
Attorney, Agent, or Firm—Bruce L. Adams; Van C. Wilks

[57] ABSTRACT

A stable, non-shrinking cellular concrete in which cell integrity is maintained and cell coalescing is substantially eliminated is provided by the addition of a colloidal solution or sol-gel of sodium bentonite, peptized calcium bentonite, attapulgite or a gelled silica sol-gel, such as a sol-gel of sodium silicate-calcium chloride, to a cellular concrete mix. The improved cellular concrete is characterized by an increased strength to weight ratio and is therefore more suitable for use in structural applications as well as for insulation purposes. Moreover, the improved cellular concrete is buoyant since it absorbs substantially no water in its cells since the cells have not coalesced and are not interconnected. By virtue of the non-coalescence and non interconnection of the multitudes of tiny cells in this novel buoyant cellular concrete, which is capable of floating on a body of water, a cross-sectional cut through a mass of this lightweight concrete reveals a generally uniform structure of tiny individual and mostly symmetrical separate cells, distinctly different in appearance from the random larger, smaller, often interconnected and lopsided cells found in a cross-section of conventional cellular concrete. The improved cellular concrete is especially suitable for use in producing lightweight aggregate.

37 Claims, No Drawings

CELLULAR CONCRETE

RELATED APPLICATIONS

This is a continuation of application Ser. No. 055,725, filed May 29, 1987, now abandoned, which is a continuation-in-part of my earlier application Ser. No. 824,059 filed Jan. 30, 1986, now U.S. Pat. No. 4,673,437, which is a Continuation-In-Part of my earlier application No. 623,989 filed June 25, 1984, now U.S. Pat. No. 4,568,390.

FIELD OF THE INVENTION

This invention relates to the field of concrete technology and to compositions useful in producing cellular (foamed) concrete and to a process for producing same. The invention also relates to producing cellular concrete suitable for use in producing lightweight aggregate material therefrom, especially lightweight aggregate for use in poured concrete and concrete block mixes and for lightweight insulation mixes.

BACKGROUND OF THE INVENTION

Concrete, composed of cement, aggregate and water, is a well known building material having considerable compressive strength. There are multiplicities of application where low density concrete is a suitable, useful or desirable material since it has the advantage of light weight and favorable insulation properties.

In general there have been several methods to produce such low density concrete and lightweight aggregate. In one way, lightweight aggregate material, such as cinders available in ash heaps from coal-burning power plants, was used to produce such low density concrete products. However, a decade ago or more, when such cinders were no longer generally available, manufacturers substituted bloated slate, clays and shale, fly ash, pumice and the like which they produced in rotary kilns or sintering machines. While such kilned or sintered materials and methods using such heat-expanded materials are still currently in use, they are not very satisfactory or efficient as well as being increasingly very expensive due to material costs, fuel costs and labor costs. The expensive massive kilns or sintering equipment produce only relatively small amounts of product per working shift. Moreover, such heat-expanded aggregate making methods have not produced products with uniformly satisfactory properties. Besides requiring expensive and cumbersome machinery, heat-expansion processes create highly undesirable air pollution. Additionally, the specialized raw materials for producing such heat-expanded products are only available in certain limited geographic areas, often remote from the desired site for use.

Another manufactured lightweight aggregate is expanded slag. Hot dross is separated from the molton iron in steel production and is put in contact with water to cause bloating. Since the residue is a by-product, the aggregate is economical, but since it is dross it is neither uniform nor stable and therefore does not produce sufficiently uniform low density concrete.

Additionally, it has been suggested that low density concrete could be produced by making a "cellular concrete" by adding air-bubble containing foam to a concrete mix and trapping the air-bubbles therein. However, much of these bubbles are generally lost during the step in which the foamed composition is mixed with the concrete or during pouring of the concrete mix. The foamed compositions tend to break down or bubbles collapse and are lost during mechanical mixing of the compositions resulting in a large loss of air. Additionally, bubbles of the foamed composition tend to coalesce into each other and form relatively large and unstable air pockets, resulting in loss of cell integrity. Moreover, such cellular concretes have generally suffered from undesirable, unpredictable shrinkage and cracking during the curing or setting operation which tends to be erratic. All these factors tend to produce weakened cellular concrete. Also, such cellular concrete requires specialized on-the-job mixing apparatus, and the foam mix specifications must be tailorized for the necessary foam fluidity characteristics with increased water content needed to avoid undue loss of bubbles, rather than for the ultimate desired low-slump structural concrete mix specifications. Accordingly, such cellular concrete has found use primarily only in floor fills and roof deck applications, providing insulation and some modicum of fire protection, but due to the shrinkage and cracking or due to the need for specialized apparatus and the foam mix characteristics as described, conventional foamed concrete is generally unsuitable for use as a structural concrete.

One method of attempting to produce lightweight aggregate has been to provide a body of cured cellular concrete, breaking the body into fragments, coating the fragments with a thin layer of cement which is allowed to cure and incorporating the coated fragments in a cement matrix to form low density concrete. Such a method is disclosed for example in U.S. Pat. No. 4,351,670 issued Sept. 28, 1982 to Harold E. Grice. However, such products are not sufficiently stable and require a cumbersome process for preparation. In addition, such cellular concrete suffers from erratic curing or setting that results in setting-shrinkage or coalescing of cells and loss of cell integrity as discussed previously.

Moreover, the use of such cellular concrete to produce lightweight aggregate by heretofore employed methods has required the use of massive crushing equipment to transform the cellular concrete into suitable lightweight aggregate.

It is therefore an object of this invention to provide an easily and economically manufactured cellular concrete that can be used to produce concrete and/or insulation products with excellent and highly desirable structural, insulation, fireproofing and durability characteristics. It is also an object to provide cellular concrete of predictable density capable of being varied as may be desired over a wide density range and yet providing nearly perfectly controlled bulk densities, aggregate weights and strengths. It is a further object of this invention to provide cellular concrete that does not have erratic and abnormal setting and curing steps that result in undesirable shrinkage of the product and loss of cell integrity due to coalescing of the air-bubbles prior to setting of the concrete cells. Advantageously, this invention provides foamed concrete having a generally uniform tiny and symmetrical cell structure distinctly different from the structure of random larger and smaller cells and numerous interconnected and lopsided cells found in conventional foamed (cellular) concrete. A still further object of this invention is to provide cellular concrete with improved strength to weight ratio, decreased absorption and increased freeze-thaw durability. It is also an object of this invention to produce a cellular concrete in which setting-shrinkage is substantially eliminated and cell integrity is maintained.

A still further object of this invention is to provide lightweight aggregate material that is easily produced from cellular concrete.

An even still further object of this invention is to provide a lightweight aggregate for use in poured structural concretes, for steel fireproofing and for insulating concretes as well as for lightweight concrete blocks. Moreover, in view of the constantly increasing demand for manufactured lightweight aggregate, it is an object of this invention to provide an economically manufactured lightweight aggregate that can be produced in increased quantities to help meet the burgeoning demand.

SUMMARY OF THE INVENTION

It has been discovered that an economical, stable, non-shrinking cellular concrete can be produced by addition of a colloidal solution or sol-gel of sodium bentonite, peptized calcium bentonite, attapulgite or a gelled silica, such as a sodium silicate-$CaCl_2$ sol-gel, to a cellular concrete mix. Setting-shrinkage in the resulting cellular concrete is substantially eliminated as is cell coalescing so that cell integrity of the cellular concrete is maintained. The improved cellular concrete of this invention is characterized by an increased strength to weight ratio and therefore is much more suitable for use in structural applications as well as for insulation purposes. Additionally, the improved cellular concrete absorbs substantially no water in the cells since the cells have not coalesced and are not interconnected.

Moreover, it has further been discovered that such improved cellular concrete may be converted to substantially uniform and stable lightweight aggregate by heretofore known crushing methods.

DETAILS OF THE INVENTION

The colloidal solution or sol-gel compositions may be added to any suitable "cellular cement mix" to produce the improved cellular concrete product of this invention, which cellular concrete product avoids setting-shrinkage of the cellular concrete and substantially eliminates cell coalescing. The term "cellular cement mix" is inclusive of a mix of Portland cement, or cement and sand, or cement and crushed stone or cement, sand and crushed stone or such mixes with other typical cement mix ingredients with any suitable air-bubble containing foam as well as sufficient water to hydrate the cement mix and sustain the foam. The colloidal solution or sol-gel compositions added to the cellular concrete mix may be any of the colloidal suspensions of water-sodium bentonite, water-peptized calcium bentonite or water-attapulgite compositions or a gelled silica based sol-gel such as a sodium silicate-$CaCl_2$ sol-gel composition.

While the additive of this invention for adding to the cellular cement mix preferably comprises a colloidal suspension (hereinafter referred to as mixture) of sodium bentonite, peptized calcium bentonite or attapulgite with water in a weight ratio of about 1:10 (about 9.1% solids) the ratio of the two respective components can range from about 1:4 (about 20.0% solids) to about 1:20 (about 4.8% solids). The 1:10 mixture is preferred since it forms an extremely stable, non-separating mixture having a viscosity enabling the mixture to be most easily handled that is easily pumped and dispensed. Additionally, such an additive product can be stored for indefinite periods before use without separation occurring. Such a product can even be frozen and when thawed can be used as described herein without requiring any additional mixing or stirring. However, richer additive mixtures, for example, the 1:4 ratio mixture, while too viscous to easily handle through ordinary pumps may still be used where pumping is not required, where special dispensing capabilities are present or can be used as a concentrate in special cases. On the other hand, much leaner additive mixtures, for example, at a 1:20 ratio mixture, are much less viscous and while easily handled require much more additive to be added to the cellular cement mix to achieve the same effect as obtained with the preferred 1:10 ratio mixture. Also, as the 1:20 ratio of components in the additive is approached, the additive mixture tends to show an increasing proportion of separation on standing. However, with stirring of this 1:20 ratio additive before use, it is again rendered homogenous and can be used as discussed.

While any suitable sodium bentonite can be employed in the additive, in the cellular concrete mix formulation and in the process of this invention, it is preferred that granular sodium bentonite having an average particle size ranging from about 20 to 70 mesh (840 micron to 210 micron) be employed. Such a granular sodium bentonite is available as GPG 30 sodium bentonite from American Colloid Company, Industrial Division, of Skokie, Ill. GPG 30 sodium bentonite is preferred since, among other reasons, it causes substantially less dust during handling and mixing.

The sodium bentonite useful in the additive of this invention can be any suitable colloid clay (silicate of alumina) comprised principally of the clay mineral montmorillonite and can generally be in a granular form of any suitable gradation or in a powder form, although as indicated a granular form thereof is preferred. However, even highly milled powdered forms thereof can be employed.

The preferred GPG 30 granular sodium bentonite has the approximate chemical formula $(Al, Fe_{1.67}, Mg_{0.33})Si_4O_{10}(OH)_2Na++Ca++0.33$ and has a typical analysis (moisture free) of:

| | |
|---|---|
| silicon: | 63.02% as $SiO_2$ |
| alumina: | 21.08% as $Al_2O_3$ |
| iron (ferric): | 3.25% as $Fe_2P_3$ |
| iron (ferrous): | 0.35% as $FeO$ |
| magnesium: | 2.67% as $MgO$ |
| sodium and potassium: | 2.57% as $Na_2O$ |
| calcium: | 0.65% as $CaO$ |
| crystal water: | 5.64% as $H_2O$ |
| trace elements: | 0.72% |

Any suitable attapulgite can be employed in the additive for the cellular concrete mix formulation and in the process of this invention. Attapulgite is a hydrated aluminum-magnesium silicate $(Mg,Al)_5Si_8O_{22}(OH)_4 \cdot 4H_2O$. It is preferred that powdered attapulgite be employed as the attapulgite component of this invention, although granular attapulgite may also be employed. As examples of attapulgites found useful in this invention there may be mentioned, for example, attapulgite powder such as X-2059 or Attagel 40, both available from the Minerals and Chemicals Division of Englehard, Edison, N.J., and granular attapulgite such as AEG Granular from American Colloid Company, Industrial Division, Skokie, Ill.

While any suitable peptized calcium bentonite can be employed in the additive for the cellular concrete mix formulation and in the process of this invention, it is preferred that powdered peptized calcium bentonite having an average particle size such that 99% minimum passes through a 200 mesh (74 microns) screen be employed. Such a powdered peptized calcium bentonite is available as Polargel T and Polargel I from American Colloid Company, Industrial Division, of Skokie, Ill.

The peptized calcium bentonite useful in the additive of this invention can be any suitable colloid clay (silicate of alumina) comprised principally of the clay mineral montmorillonite and can generally be in a granular form of any suitable gradation or in a powder form, although as indicated a powdered form thereof is preferred. Calcium bentonite which has not been peptized does not provide a suitable additive according to this invention.

The colloidal suspension of sodium bentonite, peptized calcium bentonite or attapulgite in water can be prepared by the addition of sodium bentonite to water with any suitable mixing and stirring apparatus such as a high speed mixer stirrer or by addition of the bentonite or attapulgite to water and subsequent mixing of the two components with any suitable air jet agitating mixer. Such an air jet mixer could be, for example, a pipe connected to a suitable source of pressurized air, such as shop air in the range from 60 p.s.i. to 120 p.s.i., which pipe is capped at the air discharge end with a cap containing a plurality of air discharge holes or vents in the outer periphery of the cap and positioned perpendicular to the axis of the pipe. For example, a ⅜ inch pipe capped with a cap containing four ⅛ inch holes spaced approximately uniformly in the periphery of the cap is a suitable mixer for mixing sodium bentonite and water in conventional 55 gallon drums. For example, adding 25 pounds of granular sodium bentonite to 30 gallons (about 250 pounds) of water in a 55 gallon drum and mixing with the above described air jet mixer for a period of about two to five minutes produces a preferred additive mixture of the invention. Of course, larger batches of such additive mixture can be prepared when desired, such as for example, by mixing 200 pounds of granular sodium bentonite in about 250 gallons (about 2085 pounds of water) in commercially available 400 or 500 gallon tanks.

Additionally, the additive can be any suitable gelled silica based sol-gel composition, such as for example a silica-calcium chloride sol-gel. An especially preferred silica based sol-gel is provided by mixing together a solution of about 21.1 grams of calcium chloride flakes and 300 grams of water with a mixture of about 100 grams 42 degree sodium silicate and 300 grams of water. It will be appreciated, however, that other suitable silica based sol-gel can be similarly provided and employed in this invention.

The additive mixtures of the invention are employed in cellular concrete mixes to provide the improved cellular concrete mix formulations of this invention. Generally it has been found that the use of from about 1 quart to about 36 quarts or most of the heretofore described additive mixture per cubic yard of cellular concrete mix provides the benefits of this invention as discussed hereinbefore and hereinafter. As little as 1 quart of the additive mixture can be used to provide the benefits of this invention for cellular concrete. More than about 36 quarts of additive can be used per cubic yard of cellular concrete mix, but such large portions of the additive become more expensive and require more mixing time and do not produce increased benefits, and thus are generally uneconomic and wasteful. It is preferred that about 1 to about 16 quarts, most preferably about 2 to about 12 quarts, of the additive mixture per cubic yard of cellular concrete mix be employed for optimum results and optimum economics.

The improved cellular concrete of this invention is produced by addition of the hereinbefore described additive to a cellular concrete mix before the addition of the air-bubble foam composition. That is, the additive is added to and homogeneously mixed with a Portland cement, or cement and sand and/or crushed stone, if desired, and sufficient water to hydrate the cement/sand/crushed stone mixture, and thereafter a stable foam composition containing multitudes of tiny bubbles necessary to produce a cellular concrete is added to the mix. Mixing of all the ingredients is continued until the mix is uniform. The thus foamed cellular concrete mix is then discharged into suitable setting containers or forms, preferably wide and shallow setting containers, for example mortar tubs, and permitted to set. If the cellular concrete is to be employed to produce lightweight aggregate, the set cellular concrete material is then introduced into a suitable crushing apparatus, such as a jaw or roll crusher or the like or is subjected to a gridding process and crushed into lumps of lightweight aggregate.

The stable foam composition used to produce the cellular concrete products of this invention is preferably first prepared as a preformed stable foam composition and then subsequently mixed with the hereinbefore described cement mix containing an additive of this invention, and additional water if needed. Alternatively, the cellular concrete could be formed directly by producing the stable foam in situ by mixing together the hereinbefore described cement mix containing an additive of this invention, water if necessary and the required amount of components for producing the stable foam in a "whipping" type mixer. The mix is then whipped until the desired amount of foaming has been achieved whereupon the foamed mix is discharged into setting containers, permitted to set.

It is preferred, however, that the preformed foam method be employed, because that preferred method provides for extremely accurate control of the amount of foam, particularly for large sized batches. Moreover, since the foam has already been preformed in a small batch, such method requires only standard and relatively inexpensive mixing equipment that is readily available in both small and large batch sizes up to 3 cubic yards and in the very large batch sizes of 10 cubic yards or more provided by the already-mixed concrete delivery trucks in wide usage. The in situ method on the other hand requires special, expensive type whipping mixers which are generally very limited in size. It is also envisioned that the improved cellular concrete of this invention can be produced in a continuous process wherein the additive and stable foam compositions are continuously added to the hereinbefore described cement in a continuous process line for producing concrete. However, the preformed foam batch method is the preferred method. In this preferred preformed foam batch mix method, the hereinbefore described cement mix containing an additive of this invention is mixed in the usual manner for mixing a conventional batch of concrete, then just a brief time interval before delivery of the batch into a mold or building site, the preformed foam is introduced into the batch being mixed. This brief time interval is of sufficient short duration for enabling the preformed foam to become thoroughly mixed with the batch but not significantly longer than that brief duration, because the mixing agitation does tend to collapse some of the desired air-bubbles. For example, the overall mixing cycle for the batch as a whole may be of the order of about 4 to 6 minutes. Then, for example, the preformed foam is preferred to be introduced into this batch being mixed for the brief time of about 1 to 3 minutes before the end of this overall mixing cycle.

The stable foam compositions for use in this invention may be prepared from any suitable foaming agent (air-bubble foam-making agent) that when suitably mixed and agitated with water produces a foam of small cell structure which foam is stable enough to maintain cell structure without significant collapsing during the setting of the concrete with which it is mixed. As foam-making agents suitable for producing such stable foams according to this invention one can employ any suitable soap and non-soap surfactants or emulsifiers. Any suitable non-soap foam-making agent can be employed including anionic, nonionic, amphoteric, zwitterionic and cationic types.

Examples of suitable soaps are the sodium, potassium, ammonium and alkanol ammonium salts of higher fatty acids (those having 10-20 carbon atoms). Anionic non-soap surfactants can be exemplified by the alkali metal salts of organic sulfuric reaction products having in their molecular structure an alkyl radical containing from 8-22 carbon atoms and a sulfonic acid or sulfuric acid ester radical (included in the term alkyl is the alkyl portion of higher acyl radicals). Preferred are the sodium, ammonium, potassium or triethanolamine alkyl sulfates, especially those obtained by sulfating the higher alcohols ($C_8$–$C_{18}$ carbon atoms), sodium coconut oil fatty acid monoglyceride sulfates and sulfonates; sodium or potassium salts of sulfuric acid esters of the reaction product of 1 mole of a higher fatty alcohol (e.g., tallow or coconut oil alcohols) and 1 to 12 moles of ethylene oxide; sodium or potassium salts of alkyl phenol ethylene oxide ether sulfate with 1 to 10 units of ethylene oxide per molecule and in which the alkyl radicals contain from 8 to 12 carbon atoms, sodium alkyl glyceryl ether sulfonates; the reaction product of fatty acids having from 10 to 22 carbon atoms esterified with isethionic acid and neutralized with sodium hydroxide; and water soluble salts of condensation products of fatty acids with sarcosine.

Nonionic surfactants can be broadly defined as compounds produced by the condensation of alkylene oxide groups (hydrophilic in nature) with an organic hydrophobic compound, which may be aliphatic or alkyl aromatic in nature. Examples of classes of nonionic surfactants are:

1. The polyethylene oxide condensates of alkyl phenols, e.g., the condensation products of alkyl phenols having and alkyl group containing from about 6 to 12 carbon atoms in either a straight chain or branched chain configuration, with ethylene oxide, the said ethylene oxide being present in amounts equal to 10 to 60 moles of ethylene oxide per mole of alkyl phenol. The alkyl substituent in such compounds may be derived from polymerized propylene, diisobutylene, octane, or nonane, for example.

2. Those derived from the condensation of ethylene oxide with the product resulting from the reaction of propylene oxide and ethylene diamine products which may be varied in composition depending upon the balance between the hydrophobic and hydrophilic elements which is desired. For example, compounds containing from about 40% to about 80% polyoxyethylene by weight and having a molecular weight of from about 5,000 to about 11,000 resulting from the reaction of ethylene oxide groups with a hydrophobic base constituted of the reaction product of ethylene diamine and excess propylene oxide, said base having a molecular weight of the order of 2,500 to 3,000, are satisfactory.

3. The condensation product of aliphatic alcohols having from 8 to 18 carbon atoms, in either straight chain or branched chain configuration, with ethylene oxide, e.g., a coconut alcohol ethylene oxide condensate having from 10 to 30 moles of ethylene oxide per mole of coconut alcohol, the coconut alcohol fraction having from 10 to 14 carbon atoms.

4. Long chain tertiary amine oxides corresponding to the following general formula:

$$R_1R_2R_3N \rightarrow O$$

wherein $R_1$ contains an alkyl, alkenyl or monohydroxyalkyl radical of from about 8 to 18 carbon atoms, from 0 to 1 glyceryl moiety, and $R_2$ and $R_3$ contain from 1 to about 3 carbon atoms and from 0 to about 1 hydroxy group, e.g., methyl, ethyl, propyl, hydroxy ethyl, or hydroxy propyl radicals. The arrow in the formula is a conventional representation of a semipolar bond. Examples of amine oxides suitable for use in this invention include dimethyldodecylamine oxide, oleyldi-(2-hydroxyethyl) amine oxide, dimethyloctylamine oxide, dimethyldecylamine oxide, dimethyltetradecylamine oxide, 3,6,9-trioxaheptadecyldiethylamine oxide, di(2-hydroxyethyl)-tetradecylamine oxide, 2-dodecoxyethyldimethylamine oxide, 3-dodexocy-2-hydroxypropyldi (3-hydroxypropyl)amine oxide, dimethylhexadecylamine oxide.

5. Long chain tertiary phosphine oxides corresponding to the following general formula:

$$RR'R''P \rightarrow O$$

wherein R contains an alkyl, alkenyl or monohydroxyalkyl radical ranging from 8 to 18 carbon atoms in chain length, from 0 to about 10 ethylene oxide moieties and from 0 to 1 glyceryl moiety and R' and R'' are each alkyl or monohydroxyalkyl groups containing from 1 to 3 carbon atoms. The arrow in the formula is a conventional representation of a semipolar bond. Examples of suitable phosphine oxides are:
dodecyldimethylphosphine oxide,
tetradecyldimethylphosphine oxide,
tetradecylmethylethylphosphine oxide,
3,6,9-trioxaoctadecyldimethylphosphine oxide,
cetyldimethylphosphine oxide,
3-dodecoxy-2-hydroxypropyldi(2-hydroxyethyl) phosphine oxide,
stearyldimethylphosphine oxide,
cetylethylpropylphosphine oxide,
oleyldiethylphosphine oxide,
dodecyldiethylphosphine oxide,
tetradecyldiethylphosphine oxide,
dodecyldipropylphosphine oxide,
dodecyldi(hydroxymethyl)phosphine oxide,
dodecyldi(2-hydroxyethyl)phosphine oxide,
tetradecylmethyl-2-hydroxypropylphosphine oxide,
oleyldimethylphosphine oxide, 2-hydroxydodecyldimethylphosphine oxide.

6. Long chain dialkyl sulfoxides containing one short chain alkyl or hydroxy alkyl radical of 1 to about 3 carbon atoms (usually methyl) and one long hydrophobic chain which contain alkyl, alkenyl, hydroxy alkyl, or keto alkyl radicals containing from about 8 to about 20 carbon atoms, from 0 to about 10 ethylene oxide moieties and from 0 to 1 glyceryl moiety. Examples include:
octadecyl methyl sulfoxide,
2-ketotridecyl methyl sulfoxide,
3,6,9-trioxaoctadecyl 2-hydroxyethyl sulfoxide,
dodecyl methyl sulfoxide,
oleyl 3-hydroxypropyl sulfoxide,
tetradecyl methyl sulfoxide,
3-methoxytridecyl methyl sulfoxide,
3-hydroxytridecyl methyl sulfoxide,
3-hydroxy-r-dodecoxybutyl methyl sulfoxide.

Zwitterionic surfactants can be exemplified by those which can be broadly described as derivatives of aliphatic quaternary ammonium, phosphonium, and sulfonium compounds, in which the aliphatic radicals can be straight chain or branched, and wherein one of the aliphatic substituents contains from about 8 to 18 carbon atoms and one contains an anionic water-solubilizing group, e.g., carboxy, sulfonate, sulfate, phosphate, or phosphonate. A general formula for these compounds is:

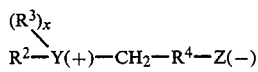

$$R^2\!-\!Y(+)\!-\!CH_2\!-\!R^4\!-\!Z(-)$$
$(R^3)_x$ wherein $R^2$ contains an alkyl, alkenyl, or hydroxy alkyl radical of from about 8 to about 18 atoms, from 0 to about 10 ethylene oxide moieties and from 0 to 1 glyceryl moiety; Y is selected from the group consisting of nitrogen, phosphorus, and sulfur atoms; $R^3$ is an alkyl or monohydroxyalkyl group containing 1 to about 3 carbon atoms; X is 1 when Y is a sulfur atom and 2 when Y is a nitrogen or phosphorus atom; $R^4$ is an alkylene or hydroxyalkylene of from 1 to about 4 carbon atoms and Z is a radical selected from the group consisting of carboxylate, sulfonate, sulfate, phosphonate, and phosphate groups. Examples include:
4-[N,N-di(2hydroxyethyl)-N-octadecylammonio]-butane-1-carboxylate;
5-[S-3-hydroxypropyl-S-hexadecylsulfonio]-3-hydroxypentane-1-sulfate;
3-[P,P-diethyl-P-3,6,9-trioxatetradexocylphosphonio]-2-hydroxypropane-1-phosphate;
3-[N,N-dipropyl-N-3-dodecoxy-2-hydroxypropylammonio]-propane-1-phosphonate;
3-(N,N-dimethyl-N-hexadecylammonio)propane-1-sulfonate;
3-(N,N-dimethyl-N-hexadecylammonio)-2-hydroxypropane-1-sulfonate;
4-[N,N-di(2-hydroxyethyl)-N(2-hydroxydodecyl)ammonio]-butane-1-carboxylate;
3-[S-ethyl-S-(3-dodecoxy-2-hydroxypropyl)sulfonio]-propane-1-phosphate;
3-(P,P-dimethyl-P-dodecylphosphonio)-propane-1-phosphonate; and
5-[N,N-di(3-hydroxypropyl)-N-hexadecylammonio]-2-hydroxyhydroxypentane-1-sulfate.

Examples of amphoteric surfactants which can be used in the compositions of the present invention are those which can be broadly described as derivatives of aliphatic secondary and tertiary amines in which the aliphatic radical can be straight chain or branched and wherein one of the aliphatic substituents contains from 8 to about 18 carbon atoms and one contains an anionic water solubilizing group, e.g., carboxy, sulfonate, phosphate, or phosphonate. Examples of compounds falling within this definition are sodium 3-dodecylaminopropionate, sodium 3-dodecylaminopropane sulfonate. N-alkyltaurines such as the one prepared by reacting dodecylamine with sodium isethionate according to the teaching of U.S. Pat. No. 2,438,091, and the products sold under the tradename "Miranol" and described in U.S. Pat. No. 2,528,378.

Many cationic surfactants are known to the art. By way of example, the following may be mentioned:
dodecyltrimethylammonium chloride;
nonylbenzylethyldimethylammonium nitrate;
tetradecylpyridinium bromide;
laurylpyridinium chloride;
cetylpyridinium chloride;
laurylisoquinolium bromide;
ditallow(hydrogenated)dimethyl ammonium chloride
dilauryldimethylammonium chloride; and
stearalkonium chloride.

Many additional nonsoap surfactants are described in McCUTCHEON'S, DETERGENTS AND EMULSIFIERS, 1979 ANNUAL, published by Allured Publishing Corporation, which is incorporated herein by reference.

The above-mentioned surfactants can be used alone or in combination in the foam compositions of the present invention.

Preferably as foam-making agents it is preferred to employ MEARL ™ liquid foaming agent, a proteinaceous material compatible with Portland cement, available from Mearl Corporation of Roselle Park, N.J.; IVORY ™ dish-liquid, a detergent mixture of anionic and nonionic surfactants with ethyl alcohol as a dispersion ingredient available from the Procter & Gamble Co.; and CALIMULSE ™ PRS, an isopropylamine sulfate foaming agent. Especially preferred is MEARL ™ liquid foaming agent.

Sufficient foam-making agent is mixed with water to produce the stable foam of small cell structures. An effective foam-making amount, generally from about 2% to about 10% by weight, preferably from about 2½% to about 5%, and most preferably from about 3% to about 3.5% of foam-making agent based on the weight of water is employed. It is to be understood that the optimal amount of foam-making agent will be dependent upon the specific foam-making agent selected for use. The foam-making agent and water are mixed in any suitable mixing vessel to produce the stable foam composition. For example these ingredients can be mixed into foam with multitudes of tiny bubbles therein in a MIXMASTER ™ mixer or by mixing in a commercially available foam generator, such as is available from Mearlcrete Corporation of Roselle Park, N.J.

As an example of a stable foam composition suitable for use in producing the improved cellular concrete of this invention there can be mentioned the stable foam produced by suitably mixing 3 grams of MEARL ™ liquid foaming agent and 90 milliliters of water. This exemplary stable foam composition has been utilized to prepare exemplary cellular concrete products of this invention. It will be appreciated, however, that any suitable stable foam composition can be employed to produce the cellular concrete products of this invention.

It will be appreciated that by varying the mixed materials ratios, variable yet controlled cellular concrete densities and strengths can be achieved over a relatively wide range of density as measured in pounds per cubic foot. Thus, cellular concrete can be readily designed to fit any particular end use design parameter desired. For example, it is possible to obtain suitable cellular concrete having any desired predetermined bulk density in the range of from about 15 to about 95 lbs/ft$^3$.

The amount of foam employed in the cement or cement mix will be determined by the amount and type other conventional cement or cement mix ingredients employed and the bulk density that one desires to obtain. The less foam one employs generally the higher the bulk density of the product and correspondingly the more foam employed the lower the bulk density of the product. For example, to obtain a cellular concrete having a bulk density of about 95 lb/ft$^3$ one would employ about 10 to 15% foam by volume based on the volume of the total cement mix. To obtain an especially light cellular concrete, such as one with a bulk density of about 15 to 25 lb/ft$^3$, one would employ from about 50 to about 60% by volume of foam based on the total volume of the cement mix.

As examples of the controllable weight ranges of cellular concrete that one can produce according to this invention the following four exemplary mixes are given. Each of the exemplary mixes described hereinafter contains about 2 quarts of the additive, a colloidal sodium bentonite, per cubic yard of concrete mix. Mix I is designed to yield an aggregate approximating the density of a commercially available expanded shale aggregate, SOLITE TM. Mix II is designed to yield an aggregate of minimum weight, yet still strong enough for use in some structural applications such as steel fireproofing and for partition block. Mixes III and IV are designed to yield aggregates at a median density between Mixes I and II.

| COMPONENTS | MIX I | MIX II | MIX III | MIX IV |
|---|---|---|---|---|
| (parts by volume) | | | | |
| Portland Cement | 1 | 1 | 1 | 1 |
| Sand | 4 | — | 1.74 | 3 |
| Foam | 1.03 | 2.25 | 2.34 | 2.4 |
| Mixing Water | 1.16 | .59 | .66 | .84 |
| Fresh-poured density (lb/ft$^3$) | 92.0 | 39.9 | 69.5 | 69.8 |
| Crushed, graded* aggregate density (lb/ft$^3$)** | 62.4 | 23.4 | 43.0 | 38.0 |

*Aggregates are all minus ¼" and graded to duplicate the sieve analysis of a commercially available expanded shale aggregate example.
**All bulk density weights are calculated from "jigged" volumes of material.

The unexpected nature of the cellular concrete products of this invention is illustrated but not limited by the following examples. The examples demonstrate that the improved cellular concrete products of this invention eliminate two of the well known drawbacks and detrimental characteristics of cellular concrete which has rendered the production and use of cellular concrete troublesome in the past, namely the erratic and abnormal setting-shrinkage and loss of cell integrity due at least in part to the coalescing of cells.

EXAMPLES 1 TO 4

Five identical cement mix batches were produced, each having the following components:

| Portland cement | 39.8 lbs |
|---|---|
| Water | 22.3 lbs |

To one of said batches, to be used as a comparison example, no sol-gel additive was added. To each of the remaining four batches, designated Examples 1 to 4, one of the following four sol-gel additives was added and uniformly mixed therein in an amount of 2 gallons of additive per cubic yard of poured concrete mix. The additives employed in each of the examples are as follows:

Examples 1, 2 and 3: sol-gels produced by mixing 1 part peptized calcium bentonite, sodium bentonite and attapulgite, respectively, with 9 parts water (by weight), and Example 4: a sol-gel produced by mixing 21.1 grams calcium chloride flake and 300 grams water with a mixture of 100 grams of 42 degree sodium silicate and 300 grams of water.

Thereafter, 0.857 cu ft of preformed foam made in a conventional foam generator from 4% MEARL TM liquid foaming agent and 96% water was metered into each of the five mixes by a conventional solenoid timer and the resulting mixes were uniformly mixed. Each of the uniform mixes was poured into 6"H×13" W×23" L plastic mortar tubs and permitted to set and observed for setting-shrinkage.

Following a 24 hour set period the samples were observed with the following results. The cellular concrete produced by the comparative example with no additive shrank about ¾" in height and about ⅛" from the tub sides around the top periphery. Examples 1 through 4, containing the sol-gel additive produced no shrinkage in height nor around the periphery.

Each of the set specimens was then split for observation. Specimens from Examples 1 through 4 all displayed a uniformly micro-celled internal structure whereas the specimen of the comparative batch had much enlarged cells and random larger and smaller cells and lopsided cells indicating considerable cell coalescing during setting.

Additionally, when samples of each specimen are placed in water, the specimens of Examples 1 through 4 remain buoyant, floating relatively high on the surface of the water. In fact, such specimens have been thus buoyant for a period of several months and show no signs of losing buoyancy, i.e. of settling to a different elevation. In contrast, the specimen of the comparative batch absorbs water into its cells, which are interconnected due to coalescing, and lost buoyancy and sank to the bottom of the water in less than one minute.

When the hereinbefore described colloidal or sol-gel additives are employed in producing cellular concrete, it has been discovered that setting-shrinkage and cell coalescing is predicably and invariably substantially eliminated in contradistinction to the heretofore known propensity for poured cellular concrete to be entirely unpredictable in its shrinkage and coalescing of cells. Only with the present invention has it become possible to produce cellular concrete having small substantially uniform and generally symmetrical micro-cells that are not interconnected and which is not subject to setting-shrinkage and cell coalescing.

EXAMPLES 5 TO 12

As described hereinbefore with respect to Example 2, eight identical batches of cellular cement mix were prepared employing varying amounts of the sodium bentonite sol-gel, as follows:

| Example No. | Amount of Sol-Gel per cubic yard of concrete |
| --- | --- |
| 5 | 1 pint |
| 6 | 1 quart |
| 7 | 2 quarts |
| 8 | 4 quarts |
| 9 | 8 quarts |
| 10 | 12 quarts |
| 11 | 24 quarts |
| 12 | 36 quarts | and the uniformly mixed batches were poured into a plastic mortar tub for setting. An identical mix without any sol-gel was prepared as a comparative example and poured into a similar mortar tub for setting.

Following a twenty-four hour set period, the batches were observed for shrinkage and then split for observation of cell structure. The comparative example had ⅛" shrinkage away from the tub sides around the top periphery as well as ⅛" shrinkage in height at the top periphery, plus about ¼" concaving of the top surface. Example 5 had about ¼" concaving of the top surface and about ⅛" shrinkage away from the tub sides at the top periphery but had no height-shrinkage at the top periphery. Example 6 had only hairline-shrinkage away from the tub sides at the top periphery and no top shrinkage or concavity. Examples 7 through 12 produced no shrinkage whatsoever. Example 5 and the comparative example had small cells whereas Examples 6 through 12 had uniform micro-cells. It was observed during splitting of the samples that the large amounts of sol-gel in the examples did not adversely affect the cellular concrete produced since they were observed to be as hard or harder than the examples with lesser amounts of sol-gel.

I claim:

1. A cellular concrete mix for the preparation of cellular concrete comprises
(a) a cement mix,
(b) water,
(c) an additive comprising a colloidal solution or sol-gel composition selected from the group consisting of suspensions of water-sodium bentonite, water-peptized calcium bentonite, water-attapulgite and a gelled silica based sol-gel, and
(d) a stable small-celled foam composition comprising a foam-making agent,
the water being present in an amount to hydrate the cement mix and sustain the foam and the additive being present in an amount sufficient to substantially eliminate setting-shrinkage of the cellular concrete and prevent cell coalescing.

2. A cellular concrete mix according to claim 1 wherein the additive is present in an amount of from about 1 quart to about 36 quarts per cubic yard of cellular concrete mix.

3. A cellular concrete mix according to claim 1 wherein the additive is present in an amount of from about 1 quart to about 16 quarts per cubic yard of cellular concrete mix.

4. A cellular concrete mix according to claim 1 wherein the additive is present in an amount of from about 2 quarts to about 12 quarts per cubic yard of cellular concrete mix.

5. A cellular concrete mix according to claim 1 wherein the additive comprising a colloidal suspension of sodium bentonite, peptized calcium bentonite or attapulgite in water in a weight ratio of sodium bentonite, peptized calcium bentonite or attapulgite to water of from about 1:4 to about 1:20.

6. A cellular concrete mix according to claim 2 wherein the additive comprises a colloidal suspension of sodium bentonite, peptized calcium bentonite or attapulgite in water in a weight ratio of sodium bentonite, peptized calcium bentonite or attapulgite to water of from about 1:4 to about 1:20.

7. A cellular concrete mix according to claim 3 wherein the additive comprises a colloidal suspension of sodium bentonite, peptized calcium bentonite or attapulgite in water in a weight ratio of sodium bentonite, peptized calcium bentonite or attapulgite to water of from about 1:4 to about 1:20.

8. A cellular concrete mix according to claim 4 wherein the additive comprises a colloidal suspension of sodium bentonite, peptized calcium bentonite or attapulgite in water in a weight ratio of sodium bentonite, peptized calcium bentonite or attapulgite to water of from about 1:4 to about 1:20.

9. A cellular concrete produced by the process comprising substantially uniformly mixing together:
(a) a cement mix,
(b) water,
(c) an additive comprising a colloidal solution or sol-gel composition selected from the group consisting of suspensions of water-sodium bentonite, water-peptized calcium bentonite, water-attapulgite and a gelled silica based sol-gel,
and uniformly mixing therewith:
(d) a stable small-celled foam composition comprising a foam-making agent,
the water being present in an amount to hydrate the cement mix and sustain the foam and the additive being present in an amount sufficient to substantially eliminate setting-shrinkage of the cellular concrete and prevent cell coalescing, to form a cellular cement mix and thereafter permitting the cellular cement mix to set forming a cellular concrete substantially free of setting-shrinkage and loss of cell integrity due to coalescing of cells.

10. A cellular concrete of claim 9 which is buoyant and floats on the surface of water for at least several months.

11. Lightweight aggregate comprising the cellular concrete of claim 9 which has been crushed.

12. A cellular concrete mix for the preparation of cellular concrete, comprising:
(a) a cement mix,
(b) water,
(c) an additive comprising a gelled silica based sol-gel of silica-calcium chloride, and
(d) a stable small-celled foam composition comprising a foam-making agent,
the water being present in an amount to hydrate the cement mix and sustain the foam and the additive being present in an amount sufficient to substantially eliminate setting-shrinkage of the cellular concrete and prevent cell coalescing.

13. A cellular concrete mix according to claim 12; wherein the additive is present in an amount of from about 1 quart to about 36 quarts per cubic yard of cellular concrete mix.

14. A cellular concrete mix according to claim 12; wherein the additive is present in an amount of from about 1 quart to about 16 quarts per cubic yard of cellular concrete mix.

15. A cellular concrete mix according to claim 12; wherein the additive is present in an amount of from about 2 quarts to about 12 quarts per cubic yard of cellular concrete mix.

16. A cellular concrete according to claim 9; wherein the additive is present in an amount of from about 1 quart to about 36 quarts per cubic yard of cellular concrete mix.

17. A cellular concrete according to claim 9; wherein the additive is present in an amount of from about 1 quart to about 16 quarts per cubic yard of cellular concrete mix.

18. A cellular concrete according to claim 9; wherein the additive is present in an amount of from about 2 quarts to about 12 quarts per cubic yard of cellular concrete mix.

19. A cellular concrete according to claim 9; wherein the additive comprises a colloidal suspension of sodium bentonite, peptized calcium bentonite or attapulgite in water in a weight ratio of sodium bentonite, peptized calcium bentonite or attapulgite to water of from about 1:4 to about 1:20.

20. A cellular concrete according to claim 16; wherein the additive comprises a colloidal suspension of sodium bentonite, peptized calcium bentonite or attapulgite in water in a weight ratio of sodium bentonite, peptized calcium bentonite or attapulgite to water of from about 1:4 to about 1:20.

21. A cellular concrete according to claim 17; wherein the additive comprises a colloidal suspension of sodium bentonite, peptized calcium bentonite or attapulgite in water in a weight ratio of sodium bentonite, peptized calcium bentonite or attapulgite to water of from about 1:4 to 1:20.

22. A cellular concrete according to claim 18; wherein the additive comprises a colloidal suspension of sodium bentonite, peptized calcium bentonite or attapulgite in water in a weight ratio of sodium bentonite, peptized calcium bentonite or attapulgite to water of from about 1:4 to about 1:20.

23. A cellular concrete according to claim 9; wherein the additive is a sol-gel of silica-calcium chloride.

24. A cellular concrete according to claim 16; wherein the additive is a sol-gel of silica-calcium chloride.

25. A cellular concrete according to claim 17; wherein the additive is a sol-gel of silica-calcium chloride.

26. A cellular concrete according to claim 18; wherein the additive is a sol-gel of silica-calcium chloride.

27. Lightweight aggregate comprising the cellular concrete of claim 16 which has been crushed.

28. Lightweight aggregate comprising the cellular concrete of claim 17 which has been crushed.

29. Lightweight aggregate comprising the cellular concrete of claim 18 which has been crushed.

30. Lightweight aggregate comprising the cellular concrete of claim 19 which has been crushed.

31. Lightweight aggregate comprising the cellular concrete of claim 20 which has been crushed.

32. Lightweight aggregate comprising the cellular concrete of claim 37 which has been crushed.

33. Lightweight aggregate comprising the cellular concrete of claim 22 which has been crushed.

34. Lightweight aggregate comprising the cellular concrete of claim 23 which has been crushed.

35. Lightweight aggregate comprising the cellular concrete of claim 24 which has been crushed.

36. Lightweight aggregate comprising the cellular concrete of claim 25 which has been crushed.

37. Lightweight aggregate comprising the cellular concrete of claim 26 which has been crushed.

* * * * *